United States Patent [19]

Heider et al.

[11] 3,740,392

[45] June 19, 1973

[54] HETEROCYCLIC CARBOXYLIC ACID ESTERS OF FLUOCINOLONE-ACETONIDE

[75] Inventors: Joachim Heider, Warthausen-Oberhofen; Wolfgang Eberlein; Günther Engelhardt, both of Biberach/Riss, all of Germany

[73] Assignee: Ingelheim Boehringer GmbH, Ingelheim am Rhine, Germany

[22] Filed: Jan. 26, 1971

[21] Appl. No.: 109,975

[30] Foreign Application Priority Data
Feb. 4, 1970 Germany.................. P 20 05 002.6

[52] U.S. Cl..................... 260/239.55 D, 424/241
[51] Int. Cl.......................................... C07c 173/10
[58] Field of Search ...... Machine Searched Steroids

[56] References Cited
UNITED STATES PATENTS
3,053,836    9/1962    Fried............................. 260/239.55

3,374,230    3/1968    Gardner et al................. 260/239.55

*Primary Examiner*—Henry A. French
*Attorney*—Hammond & Littell

[57] ABSTRACT

Novel esters of fluocinolone-acetonide or $6\alpha,9\alpha$-difluoro-$16\alpha,17\alpha$-isopropylidenedioxy-$\Delta^{1,4}$-pregnadiene-$11\beta,21$-diol-3,20-dione of the formula

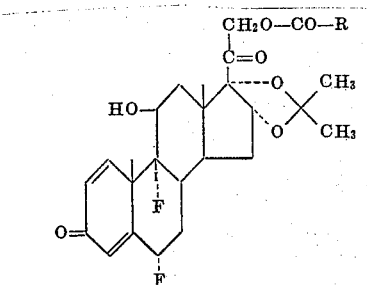

wherein R is selected from the group consisting of pyridine-3, pyridine-4, benzofuran-2 or 1-menthoxymethyl having high glucocorticoid and antiphlogistic activity and their preparation.

5 Claims, No Drawings

HETEROCYCLIC CARBOXYLIC ACID ESTERS OF FLUOCINOLONE-ACETONIDE

OBJECT OF THE INVENTION

It is an object of the invention to provide the novel esters of fluocinolone-acetonide of formula I.

It is another object of the invention to provide a novel process for the preparation of the esters of formula I.

It is a further object of the invention to provide novel therapeutic compositions having high glucocorticoid and antiphlogistic activity.

It is an additional object of the invention to provide a novel method of reducing inflammation in warm-blooded animals.

These and other objects and advantages of the invention will become obvious from the following detailed description.

THE INVENTION

The novel esters of the invention have the formula

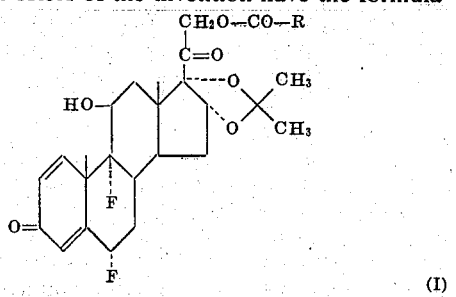

wherein R is selected from the group consisting of pyridine-3, pyridine-4, benzofuran-2 or 1-menthoxymethyl. Compounds of formula I are fluocinolone-acetonide-21-isonicotinate, fluocinolone-acetonide-21-nicotinate, fluocinolone-acetonide-21-benzofuranate and fluocinolone-acetonide-21-1-menthoxy-acetate.

The novel process of the invention for the preparation of the esters of formula I comprises reacting fluocinolone-acetonide of the formula

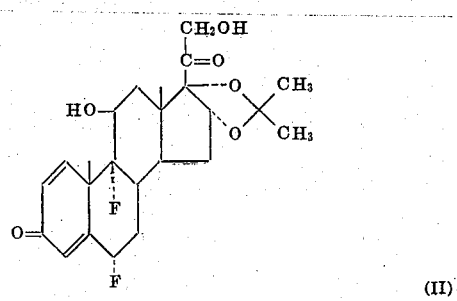

with an acylating derivative of an acid selected from the group consisting of nicotinic acid, isonicotinic acid, benzo-2-furan carbonic acid and 1-menthoxy-acetic acid at a temperature of 0° to 90° to form the corresponding 21-acid ester of fluocinolone-acetonide. The acylating derivative may be an acid halide, symmetrical or mixed acid anhydride or imidazolides.

The reaction is preferably carried out in the presence of an inert organic solvent such as tetrahydrofuran, dimethyl formamide or dioxane and optionally in the presence of a hydrogen halide binding agent, preferably in the presence of a tertiary amine such as pyridine. This amine may even be simultaneously used as the solvent. If an imidazolide of one of the mentioned acids is used, the reaction will proceed at room temperature and produces a high yield especially if an imidazole salt is used as catalyst. It is not necessary to isolate the used imidazolide. A solution of sulfinyl diimidazolide in an inert solvent obtained in known manner is preferably mixed with the corresponding acid and after approximately 30 minutes stirring, the fluocinolone-acetonide is added thereto.

The new compounds can also be obtained by reacting fluocinolone-acetonide with one of the mentioned carboxylic acids if dicyclohexylcarbodiimide is used as dehydrating agent. This reaction is advantageously carried out in a solvent such as pyridine or dioxane at room temperature or at elevated temperatures. The progress of the reaction can be checked in all cases by thin-layer chromatography. The crude product thus obtained may be purified for example, chromatographically, for instance over a silica gel column.

The novel glucocorticoid and antiphlogistic compositions of the invention are comprised of an effective amount of at least one ester of formula I and a major amount of a pharmaceutical carrier. The compositions may be in the form of aerosols, ointments, creams, tinctures, drops and suspensions. Topical preparations preferably contain 0.00125 to 0.125 percent, preferably 0.01 percent, by weight of the esters of formula I and individual systemic doses are 0.05 to 0.25 mg, preferably 0.125 mg, of the active ester of formula I. The compositions may also contain other active ingredients such as antibiotics, antihistamines and vasoconstrictive agents for use in eye drops or ear drops, for example.

The novel method of the invention for reducing inflammation in warm-blooded animals comprises administering to warm-blooded animals an effective amount of an ester of formula I. The said esters can be administered topically or systemically, i.e., orally or transcutaneously. The usual daily systemic dose is 0.25 to 2.0 mg/kg.

In the following examples there are described several preferred embodiments to illustrate the invention. However, it should be understood that the invention is not intended to be limited to the specific embodiments.

EXAMPLE 1

Fluocinolone-acetonide-21-isonicotinate 225 mg of fluocinolone-acetonide dissolved in 4 ml of pyridine and 250 mg of isonicotinic acid anhydride dissolved in 4 ml of dioxane were mixed together and stirred for four hours at room temperature. The progress of the reaction was checked by thin-layer chromatography. After pouring the reaction solution into approximately 100 ml of 3 percent ammonium chloride solution, the precipitate was filtered off and dissolved in chloroform. The solution was dried and evaporated to dryness and the residue was recrystallized from a methanol/water mixture to obtain 260 mgm(95 percent of theory) of fluocinolone-acetonide-21-isonicotinate or 6α,9α-di-fluoro-16α,17α-isopropylidenedioxy-21-isonicotinoyloxy-$\Delta^{1,4}$-pregnadiene-11β-ol-3,20-dione in the form of white crystals melting at 250°C (decomp.).

EXAMPLE 2

Fluocinolone-acetonide -21-benzofuranate 225 mgm of fluocinolone-acetonide dissolved in 2 ml of pyridine and 250 mgm of benzofuran-2-carbonic acid chloride dissolved in 3 ml of dioxane were admixed and stirred for 6 hours at room temperature. The course of the reaction was followed by thin-layer chromatography. After having poured the reaction solution into approximately 100 ml of 3 percent ammonium chloride solution, the precipitate was filtered off and subsequently dissolved in chloroform. The chloroform solution was dried and evaporated to dryness. The residue was recrystallized from methanol/water mixture to obtain 295 mgm (95 percent of theory) of fluocinolone-acetonide-21-benzofuranate or 6α,9α-difluoro-16α,17α-isopropylidinedioxy-21-(benzofuran-2-carbonyloxy)-Δ$^{1,4}$-pregnadiene-11β-ol- 3,20-dione in the form of white crystals melting at 265° to 270°C.

EXAMPLE 3

Fluocinolone-acetonide-21-nicotinate 225 mgm of fluocinolone-acetonide dissolved in 4 ml of pyridine and 250 mgm of nicotinic acid and 500 mgm of dicyclohexylcarbodiimide dissolved in 4 ml of dioxane were mixed together and stirred at room temperature for 20 hours. The reaction mixture was further processed as described in Example 1 and subsequently the reaction mixture was purified chromatographically over a silicagel column (silicagel 0.2–0.5 mm; chloroform:methanol 19:1, 9:1 and 7:1). The reaction product was recrystallized from a mixture of ether and hexane to obtain 160 mgm (53 percent of theory) of fluocinolone-acetonide-21-nicotinate or 6α,9α9α-difluoro-16α,17α17α-isopropylidenedioxy-21-nicotinoyloxy-Δ$^{1,4}$-pregnadiene-11β-ol -3,20-dione in the form of white crystals melting at 200°–203°C.

EXAMPLE 4

Fluocinolone-acetonide-21-isonicotinate 0.15 ml of thionyl chloride was added dropwise to a solution of 400 mg of imidazole in 10 ml of tetrahydrofuran and the precipitate of imidazole hydrochloride was vacuum filtered under a nitrogen atmosphere. 240 mg of isonicotinic acid were added to the filtrate and the mixture was shaken for 30 minutes. Then, 100 mg of fluocinolone acetonide and sodium imidazolide (catalyst) were added to the reaction mixture which was allowed to stand overnight. Thin-layer chromatography showed the reaction to be complete and the reaction mixture was then processed as in Example 1. The product was recrystallized from a methanol/water mixture to obtain 95 mg (67 percent of theory) of fluocinolone acetonide-21-isonicotinate or 6α, 9α-difluoro-16α,17α-isopropylidenedioxy-21-isonicotinoyloxy-Δ$^{1,4}$-pregnadiene-11β-ol-3,20-dione in the form of white crystals beginning to melt at 250°C (decomp.).

EXAMPLE 5

Fluocinolone-acetonide-21-1-menthoxy-acetate 450 mg of fluocinolone-acetonide, 500 mg of 1-menthoxyacetic acid and 500 mg of dicyclohexylcarbodiimide were dissolved in 5 ml of pyridine and the solution was heated on the steam bath for 5 hours. The reaction mixture was evaporated to dryness and the residue was dissolved in acetone. The solution was filtered to remove dicyclohexylurea and the filtrate was purified over a silicagel column (0.2–0.5 mm) with chloroform:acetone 19:1, 9:1 and 7:1. The crude product was recrystallized from a 1:1 water/ethanol mixture to obtain 600 mg 92 percent of theory) of fluocinolone acetonide-21-menthoxy-acetate or 6α,9α-difluoro-16α,17α -isopropylidenedioxy-21-(1-menthoxy acetoxy)- Δ$^{1,4}$-pregnadiene-11β-ol-3,20-dione in the form of white crystals melting at 202°–205°C.

PHARMACEUTICAL EXAMPLES

EXAMPLE A

Metered aerosol inhalator composition: Composition:
1 Container of 125 single doses contains:

| | |
|---|---|
| Fluocinolone-acetonide-21-isonicotinate | 0.625 mgm |
| Chlorpheniramine maleate | 62.5 |
| 2-(5,6,7,8-tetrahydro-1-naphthylamino)-2-imidazoline HCl | 15.0 |
| Neomycin sulfate | 12.5 |
| Sorbitan trioleate | 43.75 |
| Chamomile oil | 6.25 |
| Isopropyl myristate | 125.00 |
| Trifluorotrichloroethane | 64.375 |
| Monofluorotrichloromethane/difluorodichloromethane/tetrafluuorodichloroethane 30 : 30: 40 | 8670.0 |
| | 9000.0 mgm |

The micronized active ingredients were suspended in a mixture of sorbitan trioleate, chamomile oil, isopropyl myristate and trifluorotrichloro ethane with an immersion homogenizer and the suspension was stirred into the propellant gas mixture cooled to −45°C. The mixture was added to the metered aerosol containers and was immediately closed by metering valves to obtain aerosol which would dispense 0.005 mg of fluocinolone-acetonide-21-isonicotinate, chlorpheniramine moleate, 0.12 mg of 2-(5,6,7,8-tetrahydro-1-naphthylamino)-2-imidazoline hydrochloride and 0.1 mg of neomycin sulfate per dose.

EXAMPLE B

Metered aerosol inhalator

Composition:
One container (= 150 single doses) contains:

| | |
|---|---|
| Fluocinolone acetonide-21-benzofuranate | 3.75 mgm |
| Sorbitan trioleate | 37.5 |
| Monofluorotrichloromethane | 2648.05 |
| Diflourodichloromethane/tetrafluorodichloroethane 70 : 30 | 7810.7 |
| | 10500.0 mgm |

Production:

Into a mixture of sorbitan trioleate and monoflourotrichloromethane was suspended micronized fluocinolone acetonide-21-benzofuranate with an immersion homogenizer. This mixture was stirred into the propellant gas mixture cooled to −50°C. At −50°C the suspension was filled into metered aerosol containers. Immediately after filling, the containers was closed by a metering valve so that 0.025 mg of fluocinolone acetonide-21-benzofuranate is dispensed in each dose.

EXAMPLE C

Ointment

Composition:

| | |
|---|---|
| Fluocinolone-acetonide-21-isonicotinate | 0.01 gm |
| Vaseline | 20.0 |
| Decyl ester of oleic acid | 15.0 |
| Cetyl alcohol | 1.0 |
| Wool wax alcohol | 2.0 |
| Sorbitan monooleate | 4.0 |
| Distilled water | 57.99 |
| | 100.0 gm |

Production:

Micronized fluocinolone-acetonide-21-isonicotinate was suspended with an immersion homogenizer into the molten fatty phase cooled to 70°C. Distilled water was heated to 70°C and emulsified into the fatty phase. It was cooled to room temperature while stirring.

EXAMPLE D

Cream with 0.01 percent of fluocinolone-acetonide-21-benzofuranate, 0.3 percent of pimaricin, 0.2 percent of hexachlorophene, 0.01 percent of vitamin-A-acetate and 0.02 percent of vitamin-E-acetate Composition:

| | |
|---|---|
| Flucinolone-acetonide-21-benzofuranate | 0.01 gm |
| Pimaricin | 0.3 gm |
| Hexachlorophene | 0.2 gm |
| Vitamin-A-acetate | 0.01 gm |
| Vitamin-E-acetate | 0.02 gm |
| Butylhydroxyanisol | 0.1 gm |
| Decyl ester of oleic acid | 11.0 gm |
| Cremophor O | 4.4 gm |
| Cetylstearyl alcohol | 5.5 gm |
| Sperm oil | 3.3 gm |
| Glycerin monostearate | 4.4 gm |
| Silicon oil AK 350 | 2.0 gm |
| Perfume concentration a la Nivea | 0.2 gm |
| 70% Sorbitol | 5.0 gm |
| Citric acid | 0.1 gm |
| Disodium phosphate · 2 H$_2$O | 0.4 gm |
| Distilled water | 63.06 gm |
| | 100.0 gm |

Production:

In a melt of decyl ester of oleic acid, Cremophor, cetylstearyl alcohol, sperm oil, glycerin monostearate and silicon oil were dissolved at 70°C hexachlorophene, vitamin-A-acetate, vitamin-E-acetate and butylhydroxyanisol. Subsequently, the micronized fluocinolone-acetonide-21-benzofuranate and the micronized pimaricin were suspended with an immersion homogenizer. Distilled water was heated to 70°C and therein were dissolved citric acid, disodium phosphate and sorbitol. The oily suspension of the active ingredients was added to the aqueous phase while stirring at the indicated temperature. The resulting emulsion was homogenized and cooled to 45°C. After addition of the perfume, the cream was degased and cooled to room temperature while stirring slowly.

EXAMPLE E

Lotion with 0.01 percent of fluocinolone-acetonide-21-isonicotinate

Composition:

| | |
|---|---|
| Fluocinolone-acetonide-21-isonicotinate | 0.01 gm |
| Sorbitan monopalmitate | 1.0 gm |
| Cremophor O | 2.0 gm |
| Cetylstearyl alcohol | 2.0 gm |
| Sperm oil | 1.0 gm |
| Decyl ester of oleic acid | 5.0 gm |
| Paraffin oil | 1.0 gm |
| Distilled water | 87.99 gm |
| | 100.0 gm |

Production:

The micronized active ingredient was suspended with an immersion homogenizer in the fatty phase at 70°C, and the suspension was emulsified into water of the same temperature. The emulsion was cooled to room temperature.

EXAMPLE F

Foam aerosol with 0.01 percent of fluocinolone-acetonide-21-isonicotinate

Composition:
One container comprises:

| | |
|---|---|
| Fluocinolone-acetonide-21-isonicotinate | 0.0025 gm |
| Glycerin | 1.0 gm |
| Isopropyl myristate | 0.3 gm |
| Cetylstearyl alcohol | 0.45 gm |
| Na cetylstearylsulfate 0.05 gm | |
| Methyl p-hydroxy-benzoate | 0.025 gm |
| Distilled water | 20.1725 gm |
| Difluorodichloromethane/tetrafluorodichloroethane 60 : 40 | 3.0 gm |
| | 25.0 gm |

Production:

The melt of isoproypl myristate with cetylstearyl alcohol and sodium cetylstearyl sulfate was emulsified into the aqueous solution of methyl p-hydroxybenzoate at 70°C. It was cooled to room temperature and the suspension of the micronized fluocinolone-acetonide-21-isonicotinate in glycerin was added. The emulsion was filled into aerosol containers. The latter were sealed by a disk valve. Subsequently, the propellant gas mixture was pressed into it by means of pressure filling and it was homogeneously distributed in the emulsion by shaking. Finally, the valves were equipped with foam dispensers.

EXAMPLE G

Tincture with 0.04 percent of fluocinolone-acetonide-21-isonicotinate, 0.5 percent of hexachlorophene and 0.02 percent vitamine-E-acetate Composition:
100 ml of tincture comprise:

| | |
|---|---|
| Fluocinolone-acetonide-21-isonicotinate | 0.04 gm |
| Hexachlorophene | 0.5 gm |
| Vitamin-E-acetate | 0.02 gm |
| 96% Ethanol | 58.54 gm |
| Distilled water | 30.0 gm |
| | 89.1 gm = 100 ml |

The active ingredients were dissolved successively in ethanol. Then the water was added and the solution was filtered.

EXAMPLE H

Eye drops with 0.01 percent of fluocinolone-acetonide-21-benzofuranate, 0.07 percent of polymyxine-B-sulfate, 0.6 percent of oxytetracyclin HCl and 0.07 percent of 2-(5,6,7,8-tetrahydro-1-naphthylamino)-2-imidazoline-HCl Composition:

| | |
|---|---|
| Fluocinolone-acetonide-21-benzofuranate | 0.01 gm |
| Polymyxine-B-sulfate 0.07 gm | |
| Oxytetracycline · HCl | 0.6 gm |
| 2-(5,6,7,8-tetrahydro-1-naphthylamino)-2-imidazoline HCl | 0.07 gm |
| Aerosil | 0.05 gm |
| Eye vaseline 27.5 gm | |
| Wool fat | 2.5 gm |
| Isopropyl myristate | 34.6 gm |
| Paraffin oil, viscous | 20.7 gm |
| Paraffin oil, fluid | 13.9 gm |
| | 100.0 gm |

Production:

Into the agglomerate-free suspension of the micronized active ingredients and Aerosil in a mixture of isopropyl myristate with paraffin oil was emulsified the warm melt (65°C) of the eye vaseline with wool fat with an immersion homogenizer. Subsequently the mixture was cooled to room temperature while stirring slowly.

PHARMACOLOGICAL DATA

A. Antiphlogistic Activity

The antiphlogistic activity was determined as antiexudative effects on egg albumin edema in the rat's hind paw. It was determined by the total activity obtainable after a single subcutaneous administration of equimolar doses.

In order to determine the antiphlogistic activity, the following compounds were tested and compared with the unesterified fluocinolone-acetonide.

A = Fluocinolone-acetonide-21 -isonicotinate
B = Fluocinolone-acetonide-21-benzofuranate
C = Fluocinolone-acetonide-21-nicotinate
D = Fluocinolone-acetonide-21-1-menthoxy-acetate.

The edema was provoked and measured as described in Arzneimittelforschung, Vol. 13, page 588 (1963). For the tests, male FW–49 rats weighing about 120-140 gm at the beginning of the test were used. The substances were injected subcutaneously in one portion as a microcrystalline suspension in a solution consisting 10 percent of ethanol in a 0.9 percent sodium chloride solution at a volume of 0.5 ml/100 gm of animal. The control animals received corresponding quantities of the carrier liquid. The edema was induced 3, 7, 23, 47, 95 hours after the one-dose administration of the substance and, in case of longer lasting activity, at further 24 hours intervals. For the animals treated with the substance as well as to the control animals, the determination of the reduction of the swelling used the values obtained after 60 minutes after the provocation of the edema.

By provoking edema at various periods after the administration of the substance being tested, points on a curve were obtained whose integral expressed the overall activity of the said products at equimolar doses. The activity integrals calculated from the individual results and the relative activity resulting therefrom are reported in Table I.

TABLE I
Anti-exudative effect

| Substance | Dosage in mgm/kg | activity integral | relative effect |
|---|---|---|---|
| Fluocinolone-acetonide | 0.25 | 937 | 1.0 |
| A | 0.308 | 2655 | 2.8 |
| B | 0.33 | 5139 | 5.5 |
| C | 0.308 | 3072 | 3.3 |
| D | 0.358 | 2048 | 2.2 |
| Fluocinolone-acetonide | 0.5 | 1904 | 1.0 |
| A | 0.615 | 5967 | 3.1 |
| B | 0.66 | 8393 | 4.4 |
| C | 0.616 | 4120 | 2.2 |
| D | 0.716 | 5238 | 2.8 |

Table I clearly shows that the esters of formula I are 2.2 to 5.5 times more active than fluocinolone acetonide when administered parenterally in single equimolar doses.

B. Glucocorticoid Activity

In order to determine the glucocorticoid activity, substances A and B were compared with regard to their total activity, obtained when administered in one portion of equimolar doses, with the activity of the unesterified fluocinolone-acetonide. The liver glycogen test was carried out as described in Arzneimittelforschung, Vol. 13, page 588 (1963). For the tests, male rats with an average weight of 80 gm at the beginning of the tests were used. On the first day of the tests, the substances were given as two single injections into the muscles of both hind legs. A 10 percent solution of ethanol in a 0.9 percent sodium chloride solution (volume per volume) was used as solvent vehicle. The control animals got the corresponding quantity of the solvent (1.0 ml per 100 gm). The difference between the average glycogen values of the animals treated with steroids and the control group, simply treated with the solvent, was measured in intervals of 24 hours after the single administration of substance in the rats, all fasting 24 hours before the withdrawal of liver. The average values for the glycogen increase served as approaching value for the activity integral on the single days following administration, until the end of the activity in comparison to the control animals.

TABLE II

| Substance | Dose, mg.m./kg. | | Increase of liver glycogen compared to control animals by mg.m. of glycogen/gm. of liver after— | | | | | Total activity [1] | Relative activity |
|---|---|---|---|---|---|---|---|---|---|
| | | | 24 hrs. | 48 hrs. | 72 hrs. | 96 hrs. | 120 hrs. | | |
| Fluocinolone-acetonide | 1.0 | $\bar{x}$ | 23.6 | 0.3 | −1.8 | | | 23.9 | 1.0 |
| | | n | 12 | 12 | 12 | | | | |
| | | $s\bar{x}$ | 0.9 | 1.4 | 0.1 | | | | |
| A | 1.23 | $\bar{x}$ | 32.5 | 24.7 | −0.7 | | | 57.2 | 2.4 |
| | | n | 12 | 12 | 12 | | | | |
| | | $s\bar{x}$ | 4.2 | 4.4 | 0.5 | | | | |
| B | 1.32 | $\bar{x}$ | 31.9 | 37.4 | 18.6 | 1.7 | −2.6 | 89.6 | 3.8 |
| | | n | 12 | 12 | 12 | 11 | 11 | | |
| | | $s\bar{x}$ | 4.0 | 4.8 | 1.9 | 1.2 | 0.5 | | |

[1] Glycogen increase in mg.m./gm. of liver.

Table II shows that esters A and B are 2.5 and 3.8 times more active than fluocinolone-acetonide in its total gluconeogenetic action obtainable after a single intramuscular injection of equimolar doses. The increase of the total action of the ester, opposite to that of fluocinolone-acetonide, is achieved mainly by prolonged duration of activity, corresponding to the determination of the antiphlogistic effect.

Various modifications of the compositions and method of the invention may be made without departing from the spirit or scope thereof and it is to be understood that the invention is to be limited only as defined in the appended claims.

We claim:

1. An ester of fluocinolone-acetonide of the formula

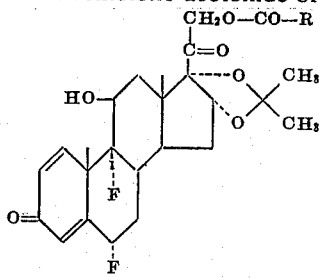

wherein R is selected from the group consisting of pyridine-3, pyridine-4, benzofuran-2 or 1-methoxymethyl.

2. The compound of claim 1 which is fluocinolone-acetonide-21-nicotinate.

3. The compound of claim 1 which is fluocinolone-acetonide-21-isonicotinate.

4. The compound of claim 1 which is fluocinolone-acetonide-21-benzofuranate.

5. The compound of claim 1 which is fluocinolone-acetonide-21 1-methoxy-acetate.

* * * * *